United States Patent [19]
Ledbetter et al.

[11] Patent Number: 5,782,259
[45] Date of Patent: Jul. 21, 1998

[54] PRESSURE RELIEF VALVE

[76] Inventors: Harold J. Ledbetter; Wayne Ledbetter, both of 8629 E. 106th St. North, Owasso, Okla. 74055

[21] Appl. No.: 691,826

[22] Filed: Aug. 5, 1996

Related U.S. Application Data

[63] Continuation of Ser. No. 429,807, Apr. 27, 1995, abandoned, which is a continuation-in-part of Ser. No. 260,871, Jun. 16, 1994, abandoned.

[51] Int. Cl.$^6$ .................................................. F16K 17/08
[52] U.S. Cl. .......................... 137/71; 137/478; 137/536
[58] Field of Search .......................... 137/71, 469, 536, 137/454.6, 478

[56] References Cited

U.S. PATENT DOCUMENTS

| | | | |
|---|---|---|---|
| 306,386 | 10/1884 | Crosby | 137/478 X |
| 308,479 | 11/1884 | Falk et al. | |
| 338,827 | 3/1886 | Coale | 137/478 |
| 409,553 | 8/1889 | Beckmann | |
| 422,385 | 3/1890 | Dennedy | |
| 631,370 | 8/1899 | Hughes | |
| 762,078 | 6/1904 | Morgan | |
| 763,208 | 6/1904 | Robinson | |
| 825,380 | 7/1906 | Coale | 137/536 X |
| 917,920 | 4/1909 | Blanchard et al. | 137/536 |
| 964,468 | 7/1910 | Guss | |
| 1,013,483 | 1/1912 | Gaa | 137/536 X |
| 1,020,921 | 3/1912 | Miller | |
| 1,377,199 | 5/1921 | Granby | 137/536 X |
| 1,665,394 | 4/1928 | Willoughby | |
| 1,725,297 | 8/1929 | Paterson | |
| 1,774,690 | 9/1930 | Willoughby | |
| 1,785,278 | 12/1930 | MacClatchie | |
| 2,072,271 | 3/1937 | Meadows | |
| 2,110,471 | 3/1938 | Crocker | |
| 2,229,079 | 1/1941 | Kenmore | |
| 2,505,992 | 5/1950 | Rike et al. | |
| 2,517,858 | 8/1950 | Farris | |
| 2,599,622 | 6/1952 | Folmsbee | |
| 2,608,210 | 8/1952 | St. Clair | |
| 2,608,992 | 9/1952 | Folmsbee | |
| 2,787,127 | 4/1957 | Benz | |
| 2,813,539 | 11/1957 | Farris | |
| 2,821,991 | 2/1958 | Marx | |
| 2,834,374 | 5/1958 | Klinkenberg | |
| 3,035,604 | 5/1962 | Portis | |
| 3,422,840 | 1/1969 | Bryant et al. | |
| 3,872,875 | 3/1975 | Raidl, Jr. | |
| 3,897,802 | 8/1975 | Bass | |
| 4,350,176 | 9/1982 | Lace | |
| 4,388,940 | 6/1983 | Powell | |
| 4,674,530 | 6/1987 | Bickford | |
| 5,094,266 | 3/1992 | Ledbetter | |

FOREIGN PATENT DOCUMENTS

| | | |
|---|---|---|
| 543016 | 12/1955 | Belgium |
| 2806003 | 8/1979 | Germany |

OTHER PUBLICATIONS

S.W. Nunnally, "Construction Methods and Managment," Sec. 12-3, 3rd Edition, Regents/Prentice Hall, p. 291.

*Primary Examiner*—John Fox
*Attorney, Agent, or Firm*—Head, Johnson & Kachigian

[57] ABSTRACT

A pressure relief valve for a fluid pressure system having a pressure vent. A body is aligned with and in fluid communication with the pressure vent, the body terminating in a cylindrical portion having a circular opening. A bonnet is in axial alignment with the circular opening and a central shaft extends axially within the bonnet. The bonnet is stationary with respect to the body. A shroud, spaced from and entirely surrounding the bonnet, is axially aligned with the bonnet to allow unobstructed fluid flow in a space parallel to the central shaft between the bonnet and the shroud. The shroud is free-standing except for a radially extending flange attachable to the body. A spindle head disk extends radially from the shaft and has a circular edge seatable in the circular opening of the lip.

20 Claims, 5 Drawing Sheets

PRESSURE RELIEF VALVE

CROSS-REFERENCE OF APPLICATION

This is a continuation of application Ser. No. 08/429,807 filed on Apr. 27, 1995 now abandoned, which is a continuation-in-part of patent application Ser. No. 08/260,871, filed Jun. 16, 1994, entitled PRESSURE RELIEF VALVE now abandoned.

BACKGROUND OF THE INVENTION

1. Field of the Invention

The present invention is directed to a self-actuated pressure release valve for use with pressurized fluids or pressurized gases. In particular, the present invention is directed to a self-actuated pressure release valve for a pressure system having a pressure vent.

2. Prior Art

Self-actuated pressure valves are not only useful but required by regulation in handling and storing of pressurized gases and liquids.

A pressure release valve should have a number of attributes. The valve should have the ability to maintain an adequate seal while under pressure. Normally, the valve will be held in a closed position by a spring. Additionally, the valve should be fast opening and self-actuated at a precise set pressure. Finally, when the pressure opens the valve at the set or "pop" pressure, the valve should remain fully open for discharge at the proper flow rate to assure adequate discharge in the event of excessive pressure. An adequate flow rate will prevent a pressure increase during discharge or accumulation. The flow rate is enhanced by a laminar flow through the valve, rather than a turbulent flow.

Pressure release valves have application in various industries and in various uses. The present pressure release valve has particular pertinence for use with air conditioning and/or heat, ventilation and air conditioning systems.

Air conditioning systems gather heat from inside a building and move it outdoors. Air conditioners cool using a coil called an evaporator and dump the heat outdoors via a coil called a condenser. A compressor moves the heat-transferring fluid called a refrigerant between the two coils. Refrigerant is the liquid used in a refrigerating system to produce cold by removing heat from the air. Presently, Refrigerant-12 which is dichlorodifluoromethane ($CCL_2F_2$), is the most widely used refrigerant. Because of R-12's adverse environmental impact on the atmosphere, refrigerant R-123 is replacing R-12.

The Clean Air Act of 1990 forbids the release of refrigerants from air conditioners into the atmosphere. Contractors are required to use special equipment to recover refrigerant.

Typically, the refrigerant in an air conditioning system is kept within an enclosed circulating system. The air conditioning system includes a pressure release vent which is sealed by a rupture disk. The rupture disk, under normal conditions, will remain sealed. The rupture disk will be designed to open at a set pressure, such as over 15 pounds per square inch. In the past, once these rupture disks broke they would allow all of the refrigerant to vent to the atmosphere.

There is a need to provide a self-actuated pressure release valve for air conditioning systems that will open at a precise load pressure and will remain open for discharge at a proper flow rate.

There is an additional need to provide a self-actuated pressure release valve that is designed to encourage laminar flow and discharge turbulent flow therethrough. This is in contrast to pressure release valves that include circuitous flow such as mufflers.

There is an additional need for a self-actuated pressure release valve for air conditioning systems wherein the seat of the valve is as close to the rupture disk as possible to provide quick response time and to minimize loss of refrigerant.

There is an additional need to provide a self-actuated pressure release valve that may be retrofit or incorporated with existing fluid pressure systems having a pressure release vent and a rupture disk.

There is an additional need to provide a self-actuated pressure release valve that may be added to air conditioning systems and other fluid pressure systems where space is a prime concern.

There is an additional need for a self-actuated pressure release valve for air conditioning systems which may be integrated with a system to capture any loss of refrigerant.

SUMMARY OF THE INVENTION

The present invention pertains to a pressure release valve which is self-actuating. The pressure release valve includes a body which is aligned with and in fluid communication with a pressure vent on a fluid pressure system. The body terminates in a lip having a circular opening.

A bonnet is in axially alignment with the circular opening and is substantially cylindrical. A central shaft extends axially within the bonnet. The bonnet extends toward the body by a series of posts. Between the posts, then, a series of vents are formed to allow fluid flow.

The central shaft passes through and is slidably received in a guide within the bonnet.

The central shaft engages a compression spring. The force of the compression spring is adjustable through a compression screw which extends axially into the bonnet, through the bonnet top and terminates in an external portion.

The body includes external threads on its cylindrical portion, these external threads mate with threads on the bonnet.

A shroud is spaced from and surrounds the body and is in axial alignment with the bonnet. A space is thus formed parallel to the central shaft between the shroud and the bonnet to allow unobstructed fluid flow therebetween. The shroud is free-standing except for an extending flange attachable to the body.

The bonnet includes a portion having a chamfered edge which is in alignment with the chamfered edge of the base of the shroud. The chamfered portions are approximately at a 45° angle to the axis of the bonnet and the axis of the shroud.

The lip of the body includes a recessed annular shoulder. A spindle head disk extends radially from the central shaft and is held in place by a fastener. The spindle head disk has a circular edge which is seatable in the annular shoulder.

A top disk extends radially from the central shaft and is held in place by a fastener. The top disk terminates in an extending flange which is spaced from the spindle head disk's circular edge, also spaced from the annular lip. The top disk mates with the spindle head disk from an annular opening therebetween. An O-ring seal is compressed between the spindle head disk and the top disk in the annular opening.

The extending flange of the top disk is spaced from the circular edge of the spindle head disk and spaced from the annular lip extending from the body. When the valve has reached the pop pressure, the shaft will be moved axially by the flow of fluid. The escaping fluid will move over the annular lip and toward the flange. The downwardly extending flange directs the discharging fluid downward toward the chamfered portions which creates lift or thrust to retain the valve in the open position.

DETAILED DESCRIPTION OF THE PREFERRED EMBODIMENTS

Figure 1:
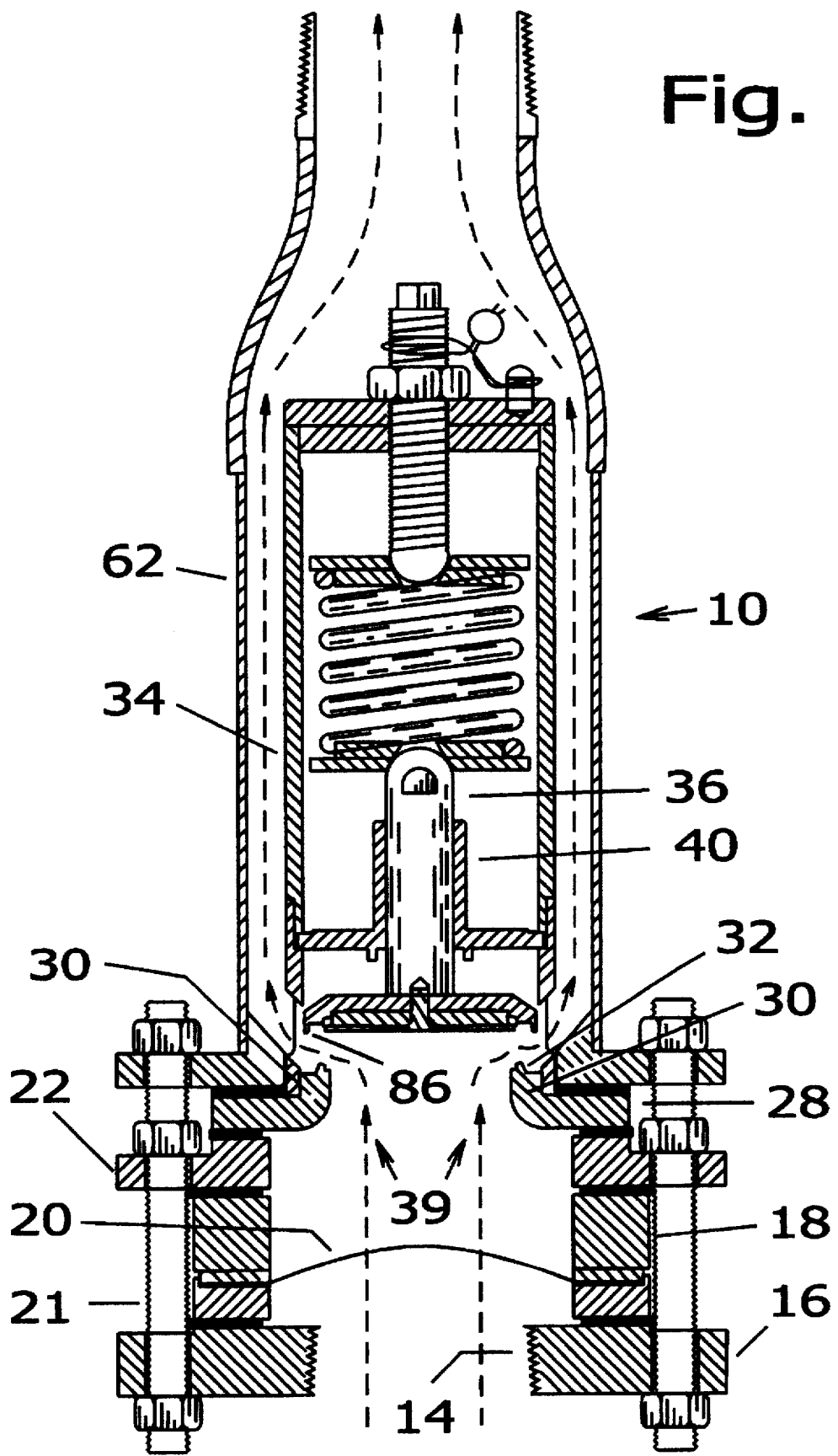
FIG. 1 is a sectional view of a pressure release valve constructed in accordance with the present invention which is shown installed with an air conditioning system with the valve in the open position.

Referring to the drawings in detail, FIG. 1 is a sectional view of a pressure release valve 10 which has been installed with an air conditioning system having a pressure vent 14. While the present embodiment is described in use with an air conditioning system, it will be recognized that the pressure release valve may be employed with other fluid pressure systems. Under normal operating conditions, the refrigerant in the air conditioning system does not exit through the pressure vent 14 but is retained to circulate within the system.

A pressure vent flange 16 is aligned with a rupture disk holder 18 which retains a rupture disk 20 therein. The pressure vent flange 16 has a series of openings to receive fasteners 21 therethrough. The rupture disk is composed of stainless steel or other substance that will not allow fluid flow under normal operation. If the pressure exceeds a certain limit, the rupture disk will break allowing the refrigerant to vent into the atmosphere. The rupture disk has no provision for closing after rupture so the entire refrigerant will be allowed to escape to atmosphere.

A capture flange 22 is above the rupture disk holder so that the rupture disk holder 18 is sandwiched between the capture flange 22 and the inlet flange.

The pressure release valve 10 includes a body 28 which is aligned with and in fluid communication with the pressure vent 14. The body 28 terminates in a cylindrical portion 30 with a lip 32 having a circular opening.

Figure 2:
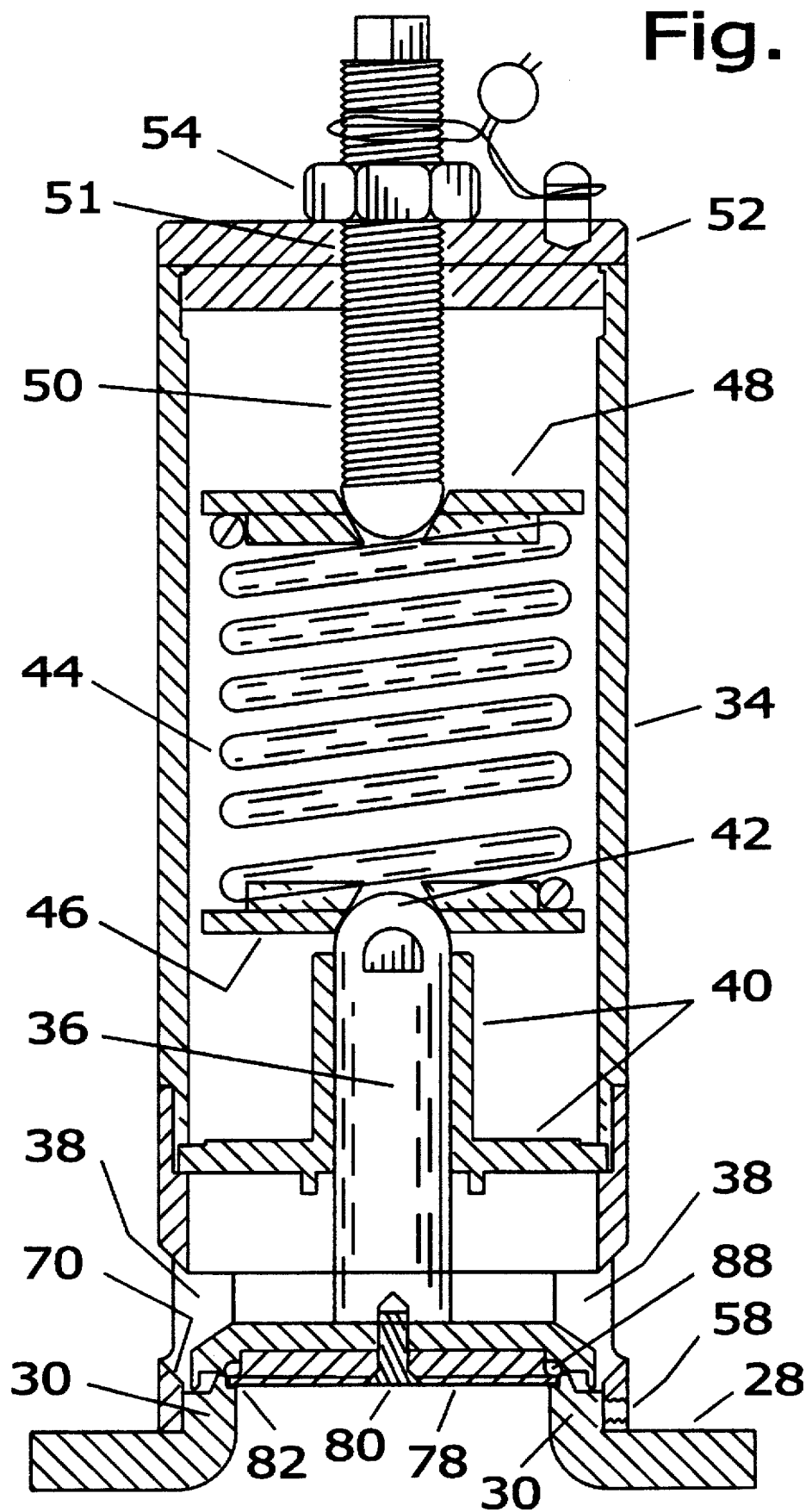
FIG. 2 is a partial sectional view of the pressure release valve shown in FIG. 1 with the shroud removed.

FIG. 1 shows the pressure release valve 10 in the open position to allow fluid flow therethrough. FIG. 2 shows the pressure release valve in the normally closed position.

A bonnet 34 is in axial alignment with the cylindrical portion 30 and circular opening formed by the lip 32 and is substantially cylindrical. The cylindrical portion 30 of the body 28 has external threads that mate with internal threads on the bonnet.

The bonnet is stationary with respect to the body. A central shaft 36 extends axially within the bonnet. The bonnet 34 extends toward the body by a series of posts 38 (two of which are visible in FIG. 2).

The body 28 and bonnet are shown apart from the air conditioning system with the shroud removed in FIG. 2. Between the posts 38, then, a series of vents are formed to allow fluid flow to pass through the circular opening formed by the lip 32 as shown by arrows 39. The central shaft 36 passes through and is slidably received in a guide 40 within the bonnet 34. The connection between the guide 40 and bonnet 34 may have a little "play" to assist in alignment but not enough to permit passage of fluid. The central shaft 36 terminates within the bonnet in a rounded end 42.

The rounded end of the shaft 36 engages a compression spring 44 through a spring washer 46. The rounded end of the shaft 36 will accommodate a variance if the spring and shaft are not precisely axially aligned. The compression spring is retained within the bonnet by a pair of opposed spring washers 46 and 48.

The end of the spring 44 opposite the central shaft is retained in place by the spring washer 48 and a compression screw 50 which extends axially into the bonnet, through an opening 51 in bonnet top 52 and terminates in an external portion. A stop nut 54 helps to lock the compression screw 50 in place and discourages axial movement.

As can be seen, the spring 44 provides an axial force on the central shaft 36. Adjusting the length of the pressure screw 50 will either provide more force or less force to the central shaft 36. The set or pop pressure may, thus, be adjusted.

Figure 3:
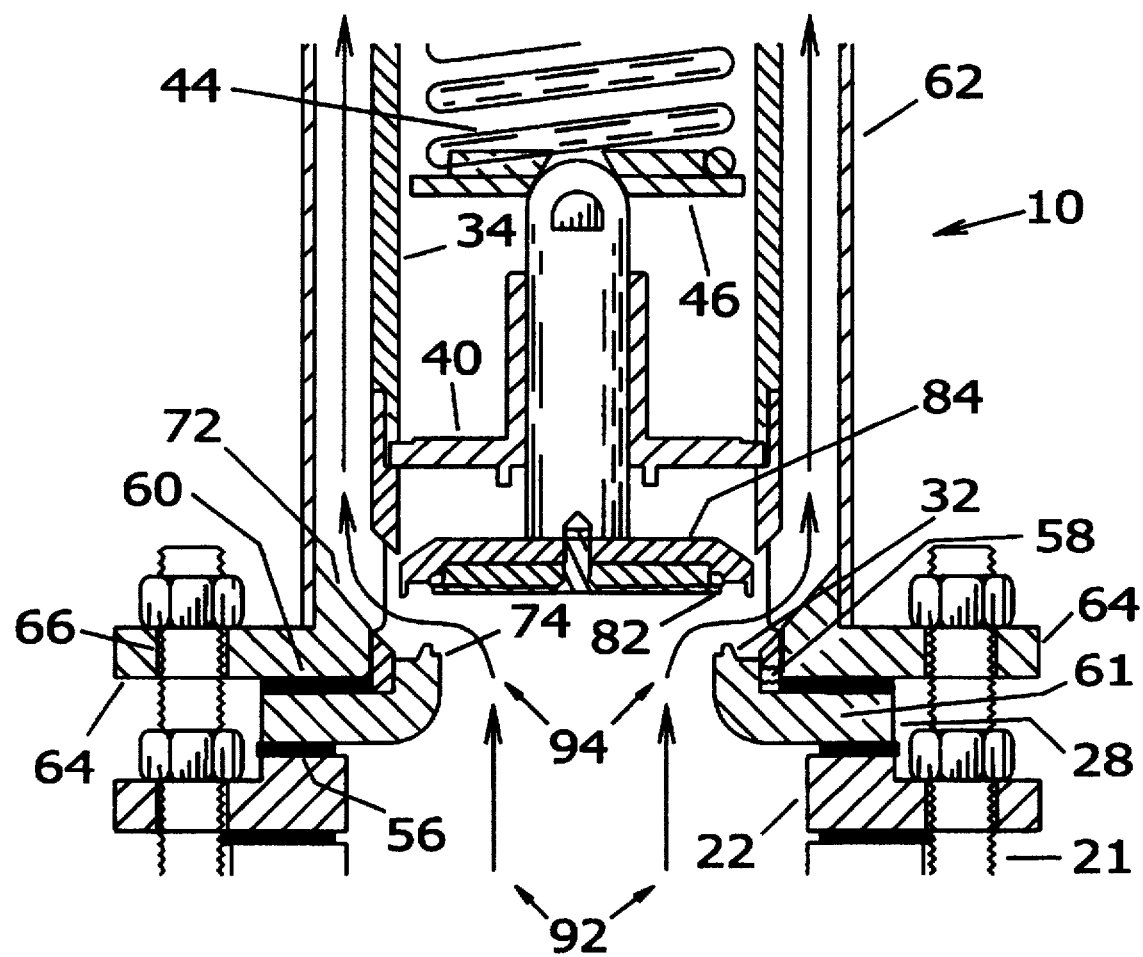
FIG. 3 shows an enlarged partial sectional view of the pressure release valve shown in FIG. 1 with the valve in the open position to allow fluid flow therethrough.
Figure 4:
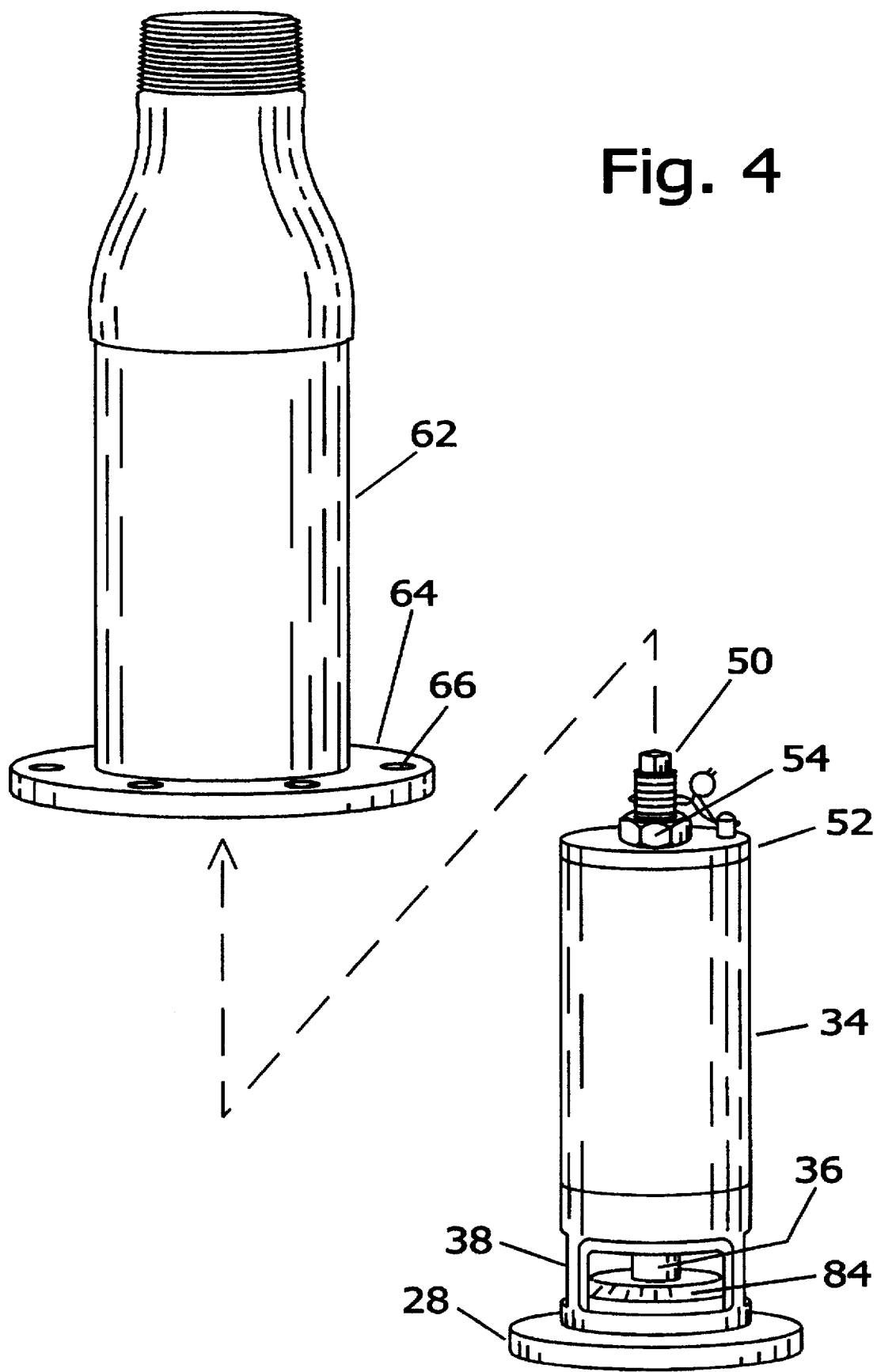
FIG. 4 is an exploded view of the pressure release valve shown in FIG. 1.

FIG. 3 shows an enlarged view of a portion of the pressure release valve 10 in the open position to allow fluid flow therethrough. A gasket 56 may be placed between the capture flange 22 and the body 28 to encourage a fluid-tight seal.

The body 28 includes external threads on the cylindrical portion 30. These external threads mate with internal threads on the bonnet 34. The bonnet is thus removably secured to the body. Once the bonnet is threaded to the body a set screw 58 may be used to secure them together.

A gasket or gaskets 60 are juxtaposed between the flange 61 of the body 28 and the shroud 62 to encourage a fluid-tight seal. The shroud 62 is spaced from and surrounds the body 28 and is in axial alignment with the bonnet 34. A space is thus formed between the shroud and the bonnet 34 to allow unobstructed fluid flow therebetween. The shroud 62 has a radially extending flange 64 with a series of openings 66 to allow the fasteners 21 therethrough. The shroud is, thus, free-standing except for the radially extending flange 64 which is attachable to the body. The shroud may, thus, be attached or detached without interfering with the operation of the valve 10 or without disassembling the valve.

The bonnet includes a portion having a chamfered edge 70 which is in alignment with a chamfered edge 72 of the shroud. The chamfered portions 70 and 72 are at approximately a 45° angle to the axis of the bonnet 34 and shroud. It has been found that 45° is an optimum angle to enhance fluid flow although it will be recognized that the angle can be varied, thereby altering the lift of the valve and thereby changing the flow rating. Fluid flow is thus permitted from the opening in the body 28 through the vents in the bonnet and into the space between the bonnet and the shroud.

As best seen in FIG. 3, the lip 32 of the body 28 includes a recessed annular shoulder 74. A spindle head disk 78 extends radially from the central shaft 36 and is held in place by a fastener 80 which passes through the spindle head disk and into the central shaft. The spindle head disk 78 has a circular edge 82 which is seatable in the annular shoulder 74.

A top disk 84 extends radially from the central shaft 36 and is held in place by fastener 80. The top disk 84 terminates in an extending flange 86 which is spaced from the spindle head disk circular edge 82 and also spaced from the annular lip 32.

The flange is substantially parallel to the axis of the bonnet and the shroud.

The top disk 84 mates with the spindle head disk to form an annular opening therebetween. An O-ring seal 88 is compressed between the spindle head disk and the top disk in the annular opening. The O-ring assists in forming a seal with the annular lip of the body. When the valve is in the closed position, the O-ring 88 compresses against the annular shoulder 74 to create a tight seal.

When the valve is not under pressure, the O-ring 88 may be replaced. This is a desirable feature in the event of wear on the O-ring and in the event of different compositions being required for different chemicals.

The extending flange of the top disk is spaced from the circular edge of the spindle head disk and spaced from the annular lip extending from the body. Spacing of the flange in this manner is important once the set or pop pressure has been reached. When the valve has reached the pop pressure, the shaft will be moved axially by the flow of fluid as shown by arrows 92. The escaping fluid will move over the annular lip 32 and toward the flange. The downwardly extending flange directs the discharging fluid downward toward the chamfered portions 70 and 72 which creates lift or thrust to retain the valve in the open position.

When the air conditioning system is at its operating pressure, there is little or no force directed on the spindle disk. If the fluid pressure exceeds the set safety pressure, the rupture disk 20 will break, allowing fluid flow to reach the spindle head. When the pressure exceeds the set pressure of the valve 10, the force of the spring 44 is overcome and the spindle head disk and the top disk begin to move axially and rise. As an example, the rupture disk and the pressure release valve 10 may both be designed for 15 psig. Once this is exceeded, the rupture disk 20 will break. The discharging fluid will then act against the outer portion of the top disk and the downwardly extending flange as well as the spindle disk. The discharging fluid acts against a surface of increased area whereby a greater total force is developed against the spring load. This causes maximum capacity or flow-through in the shortest interval and helps retains the valve 10 open at its full capacity.

The entire valve is designed to encourage laminar flow and to discourage turbulent flow. The annular lip is rounded with a radial edge to encourage a more laminar flow. Additionally, the downwardly extending flange is bevelled at its end with a 45° angle. This bevelled edge encourages flow toward 45° portion created by the chamfered portion. The direction of flow of the discharging fluid is illustrated by arrows 94.

Additionally, the stationary bonnet prevents fluid flow around the spring and provides an unobstructed passage for the fluid flow.

The design of the present valve encourages laminar flow and discourages turbulent flow. This is to be contrasted with "flow-through" valves, such as valves that allow flow through the internal parts such as guides of springs. This tends to promote turbulence and decreases the discharge. This is also to be contrasted with muffler-type valves having circuitous discharge.

The design of the valve also protects the working components from the fluids being discharged, which could be corrosive or otherwise interfere with the operation of the valve.

The attributes of the present invention may be observed from an example of a test which the valve has been subjected to. The test, pursuant to ASME code, not only measures whether the valve will open at its set pressure but whether an adequate flow rate is maintained once the valve has opened. A four-inch (4") valve was initially pressurized to its set or pop pressure so that the valve would open. The valve opened at a set pressure of 15.2 psig. Additional pressure was then supplied so that accumulation would occur. The discharge through the opening was then measured in cubic feet per minute (cfm). The valve capacity flow rate in cubic feet per minute was calculated at 1.876 cfm. In each instance the valve achieved higher than the minimum required flow rate and higher than the flow rate of other competing pressure release valves.

Placing the pressure relief valve concentrically within the shroud increased the discharge through the opening. In another test with the shroud in place, the discharge through the opening was measured at 2077 cubic feet per minute (cfm).

Placing the relief valve 10 concentrically within the shroud also minimizes the space required as opposed to placing the valve 10 in a configuration end to end with the shroud.

Figure 5:
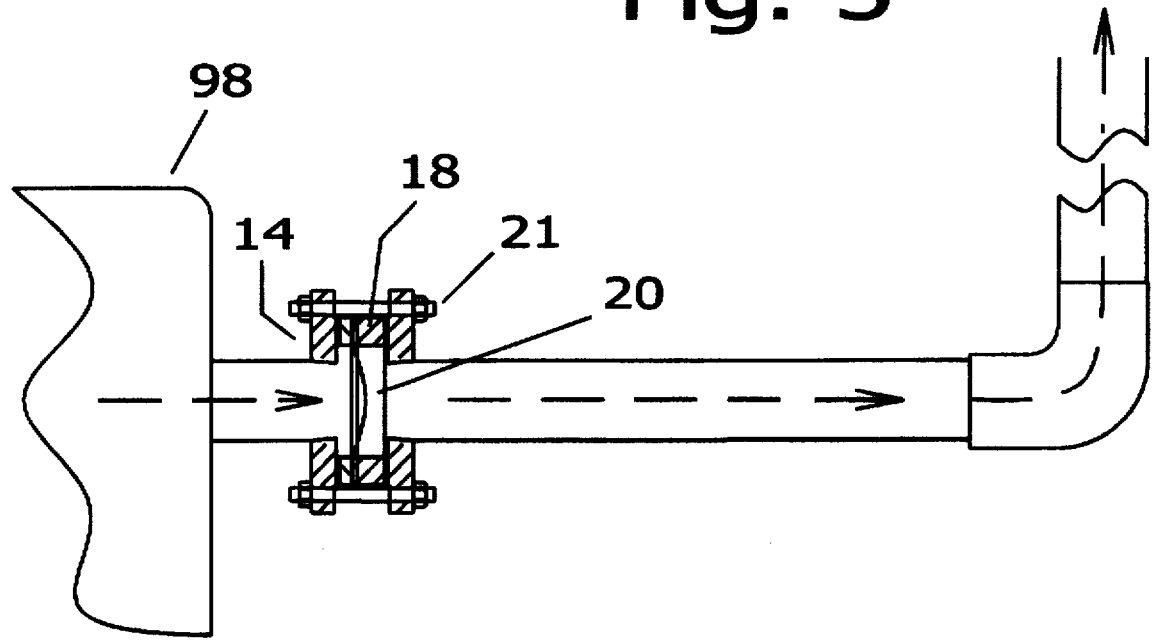
FIG. 5 is a partial view of a fluid pressure system having a rupture disk and vent prior to introduction of the present invention.

FIG. 5 is a partial view of an air conditioning system 98 with a pressure vent 14 aligned with a rupture disk holder 18 having a rupture disk 20 therein.

Figure 6:
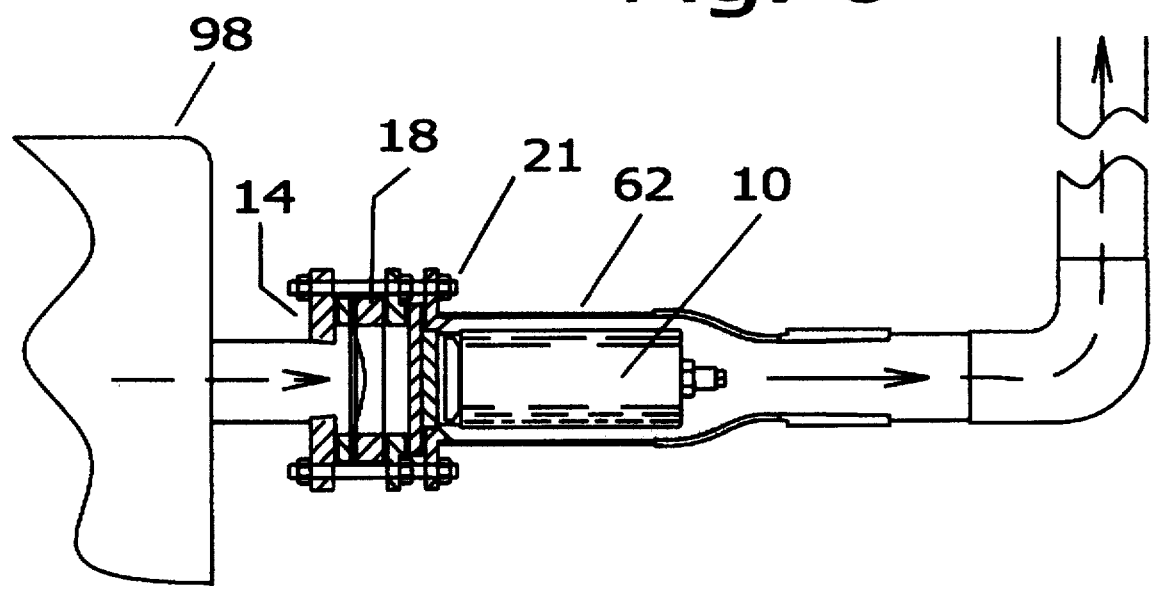
FIG. 6 is a partial view of the fluid pressure system shown in FIG. 5 with the pressure release valve of the present invention incorporated therein.

FIG. 6 is a partial view of the air conditioning system 98 with the pressure relief valve 10 of the present invention incorporated therein. It will be observed that the valve 10 may be removed in the event of servicing and the shroud replaced without taking the air conditioning system 98 out of service.

By having a valve with a shroud that is removable, it is possible to use shrouds with different outlet sizes—for example, 2-inch, 3-inch or 4-inch, thus accommodating the needs of the customer. The present valve will give more than adequate flow using shrouds with outlet sizes between 2 inches to 4 inches. This is especially important when the valve is used in a retrofit application, where different size outlets are encountered.

Whereas, the present invention has been described in relation to the drawings attached hereto, it should be understood that other and further modifications, apart from those shown or suggested herein, may be made within the spirit and scope of this invention.

What is claimed is:

1. A pressure relief valve for a fluid pressure system having a pressure vent, which valve comprises:

a. a body aligned with and in fluid communication with said pressure vent, said body terminating in a lip having a circular opening, said body detachably connected to said fluid pressure system;

b. a bonnet in axial alignment with said circular opening, a central shaft extending axially into said bonnet, said bonnet being stationary with respect to said body;

c. a fluid tight shroud spaced from and entirely surrounding said bonnet, said shroud axially aligned with said bonnet and extending from said body to allow unobstructed flow in a space parallel to said central shaft between said bonnet and said shroud to a single top outlet opening in said shroud, said shroud being freestanding except for a radially extending flange attachable to said body;

d. said body being detachable from said fluid pressure system and thereafter said shroud being reattachable to the fluid pressure system without said body; and e. a spindle head disk extending radially from said central shaft and having a circular edge seatable in said circular opening.

2. A pressure relief valve as set forth in claim 1 wherein said pressure vent is normally covered and sealed by a rupture disk.

3. A pressure relief valve as set forth in claim 1 wherein said body is cylindrical and includes an extending flange attachable to said fluid pressure system.

4. A pressure relief valve as set forth in claim 3 wherein said shroud extending flange has a plurality of openings to receive fasteners therethrough.

5. A pressure relief valve as set forth in claim 3 wherein said body is threadably attached to said bonnet.

6. A pressure relief valve as set forth in claim 3 wherein said bonnet includes a plurality of vents and said shroud includes a chamfered portion at an angle to said axis of said shroud and bonnet so that said vents correspond to said chamfered portion.

7. A pressure relief valve as set forth in claim 1 wherein said central shaft passes through and is slidably received in a guide within said bonnet.

8. A pressure relief valve as set forth in claim 1 including spring means within said bonnet to impart an axial force to said spindle head disk.

9. A pressure relief valve as set forth in claim 8 wherein said central shaft terminates in a rounded end which engages said spring means.

10. A pressure relief valve as set forth in claim 1 wherein said lip includes a recessed annular shoulder which mates with said circular edge.

11. A pressure relief valve as set forth in claim 10 including a top disk extending radially from said shaft and terminating in an extending flange spaced from said spindle head disk circular edge and spaced from said annular lip.

12. A pressure relief valve as set forth in claim 11 wherein said top disk mates with said spindle head disk to form an annular opening therebetween and including seal means providing a seal with said annular lip.

13. A pressure relief valve as set forth in claim 12 wherein said seal means includes an O-ring retained in said annular opening compressed between said spindle head disk and said top disk.

14. A pressure relief valve as set forth in claim 2 wherein said lip includes a recessed annular shoulder which mates with said circular edge.

15. A pressure relief valve as set forth in claim 2 including a top disk extending radially from said shaft and terminating in an extending flange spaced from said spindle head disk circular edge and spaced from said annular lip.

16. A pressure relief valve as set forth in claim 2 wherein said top disk mates with said spindle head disk to form an annular opening therebetween and including seal means providing a seal with said annular lip.

17. A pressure relief valve as set forth in claim 2 wherein said seal means includes an O-ring retained in said annular opening compressed between said spindle head disk and said top disk.

18. A pressure relief valve for a fluid pressure system having a pressure vent, which valve comprises:

a. a body aligned with and in fluid communication with said pressure vent, said body terminating in a lip having a circular opening, said body detachably connected to said fluid pressure system;

b. a bonnet in axial alignment with said circular opening, a central shaft extending axially within said bonnet;

c. a fluid tight shroud spaced from and surrounding said bonnet, said shroud axially aligned with said bonnet and extending from said body to allow unobstructed flow in a space between said bonnet and said shroud to a single top outlet opening in said shroud;

d. a spindle head disk extending radially from said central shaft and having a circular edge seatable in said circular opening; and e. means to remove said body from said fluid pressure system and thereafter reattach said shroud to said fluid pressure system without said body.

19. A pressure relief valve for a fluid pressure system as set forth in claim 18 wherein said pressure vent is normally covered and sealed by a rupture disk.

20. A pressure relief valve for a fluid pressure system having a pressure vent, which valve comprises:

a. a body aligned with and in fluid communication with said pressure vent, said body terminating in a lip having a circular opening, said body detachably connected to said fluid pressure system;

b. a bonnet in axial alignment with said circular opening, a central shaft extending axially into said bonnet, said bonnet being stationery with respect to said body;

c. a fluid tight shroud spaced from and entirely surrounding said bonnet, said shroud axially aligned with said bonnet and extending from said body to allow unobstructed flow in a space parallel to said central shaft between said bonnet and said shroud to a single top outlet opening in said shroud;

d. said body being detachable from said fluid pressure system and thereafter said shroud being reattachable to the fluid pressure system without said body; and e. wherein said bonnet includes a plurality of vents and said shroud includes a chamfered portion at an angle to said axis of said shroud and bonnet so that said vents align with and correspond to said chamfered portion.

* * * * *